United States Patent [19]

Deng

[11] Patent Number: 5,652,286
[45] Date of Patent: Jul. 29, 1997

[54] WET SURFACE MARKING JET INK

[75] Inventor: Godwin Deng, Schaumburg, Ill.

[73] Assignee: Videojet Systems International, Inc., Wood Dale, Ill.

[21] Appl. No.: 627,373

[22] Filed: Apr. 4, 1996

Related U.S. Application Data

[63] Continuation of Ser. No. 383,105, Feb. 3, 1995, abandoned.

[51] Int. Cl.⁶ .............................. C08K 5/54; C09D 11/00
[52] U.S. Cl. ........................ 524/261; 524/265; 524/266; 523/160; 523/161
[58] Field of Search ........................... 524/261, 265, 524/266; 523/160, 161

[56] References Cited

U.S. PATENT DOCUMENTS

| | | | |
|---|---|---|---|
| 3,060,429 | 10/1962 | Winston | 346/1 |
| 3,298,030 | 1/1967 | Lewis et al. | 346/75 |
| 3,373,437 | 3/1968 | Sweet et al. | 346/75 |
| 3,416,153 | 12/1968 | Hertz et al. | 346/75 |
| 3,673,601 | 6/1972 | Hertz | 346/75 |
| 4,045,397 | 8/1977 | Parkinson | 523/160 |
| 4,337,183 | 6/1982 | Santiago | 524/507 |
| 4,373,043 | 2/1983 | Yagi et al. | 524/267 |
| 4,680,332 | 7/1987 | Hair et al. | 524/377 |
| 4,692,188 | 9/1987 | Ober et al. | 106/23 |
| 4,880,465 | 11/1989 | Loria et al. | 106/20 |
| 5,080,716 | 1/1992 | Aoki et al. | 106/20 |
| 5,131,949 | 7/1992 | Tochihara et al. | 106/20 |
| 5,178,671 | 1/1993 | Yamamoto et al. | 106/22 |
| 5,207,825 | 5/1993 | Schwarz, Jr. | 106/22 |
| 5,213,613 | 5/1993 | Nagashima et al. | 106/20 |
| 5,215,577 | 6/1993 | Eida et al. | 106/22 |
| 5,254,158 | 10/1993 | Breton et al. | 106/20 |
| 5,316,575 | 5/1994 | Lent et al. | 106/20 |
| 5,334,690 | 8/1994 | Schafheutle et al. | 528/71 |
| 5,385,957 | 1/1995 | Tobias et al. | 523/161 |
| 5,391,685 | 2/1995 | Hitomi et al. | 523/160 |
| 5,393,331 | 2/1995 | Loria et al. | 106/20 |

FOREIGN PATENT DOCUMENTS

| | | | |
|---|---|---|---|
| 0290359A3 | 11/1988 | European Pat. Off. . | |
| 0616017A3 | 9/1994 | European Pat. Off. . | |
| 56-142430 | of 1981 | Japan . | |
| 6145580 | 5/1994 | Japan . | |
| 2105735 | 3/1983 | United Kingdom . | |
| 2277095 | 10/1994 | United Kingdom | 524/261 |

OTHER PUBLICATIONS

Kuhn et al., "Ink-Jet Printing", *Scientific American*, Apr., 1979, 162–166, 168, 170, 172, 175, 176, 178.

Keeling, "Ink Jet Printing", *Phys. Technol.*, 12(5), 196–203 (1981).

*Primary Examiner*—Paul R. Michl
*Assistant Examiner*—Olga Asinovsky
*Attorney, Agent, or Firm*—Leydig, Voit & Mayer, Ltd.

[57] ABSTRACT

Disclosed are a jet ink composition and a method for printing on wet glass, PET, and aluminum surfaces under humid conditions messages having good penetration, adhesion and abrasion resistance, said composition comprising an organic solvent, a flexible thermoplastic urethane resin, silicone resin, a silane, and a colorant.

23 Claims, No Drawings

WET SURFACE MARKING JET INK

This is a continuation of application(s) Ser No. 08/383,105 filed on Feb. 3, 1995 now abandoned.

TECHNICAL FIELD OF THE INVENTION

The present invention relates to ink jet printing compositions, particularly for use on glass, polyethylene terephthalate (PET), and aluminum substrates and, more particularly, for use on containers made of glass, PET, aluminum, or other substrates that may be subjected to humid conditions whereby moisture is created on the outside of such containers, and to related methods of printing.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well suited for application of characters onto irregularly shaped surfaces, including, for example, the bottom of glass or metal beverage containers.

Reviews of various aspects of ink jet printing can be found these publications: Kuhn et al., *Scientific American*, April, 1979, 162–178; and Keeling, *Phys. Technol.*, 12(5), 196–303 (1981). Various ink jet apparatuses are described in the following U.S. Pats. Nos. 3,060,429, 3,298,030, 3,373,437, 3,416,153, and 3,673,601.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, must be capable of passing through the ink jet nozzle without clogging, and must permit rapid cleanup of the machine components with minimum effort.

Many of the surfaces on which ink jet printing is utilized are nonporous, such as the above-mentioned beverage container. The ink used for these applications must adhere well to the nonporous substrate and normally must be water-resistant.

Many beverage manufacturers fill the containers with chilled beverages, frequently under humid conditions. The moisture that condenses on the container surfaces poses a severe problem in obtaining penetration, good adhesion of the ink, abrasion and smear resistance of the printed codes.

Several ink compositions known heretofore are not suitable for the above use. For example, UK Patent Application GB 2,105,735 discloses a jet ink composition comprising an oil soluble dye-impregnated polyurethane latex dispersed in an aqueous medium.

U.S. Pat. No. 4,680,332 discloses a jet ink composition comprising a water insoluble polymer such as a polyacrylate dispersed in a liquid medium, the polymer containing therein an oil soluble dye, and a nonionic stabilizer permanently attached thereto.

U.S. Pat. No. 5,207,825 discloses a jet ink composition which comprises an aqueous liquid vehicle, a colorant, and a polymeric additive which is a substituted bisphenol A derivative.

U.S. Pat. No. 5,080,716 discloses a jet ink composition comprising a recording agent, a liquid medium capable of dissolving or dispersing the recording agent, and a substituted benzene or toluene sulfonamide compound.

U.S. Pat. No. 5,254,158 discloses an ink composition which comprises an aqueous liquid vehicle, a colorant, and an additive selected from the group consisting of amine alkoxylates, sorbitan monoester alkoxylates, alkylene oxide adducts of glycerin, and mixtures thereof.

U.S. Pat. Nos. 5,215,577 and 5,178,671 disclose jet ink compositions comprising a recording agent and a liquid medium for dissolution or dispersion thereof, the recording agent being an aromatic sulfonated diazo compound.

U.S. Pat. No. 5,131,949 discloses a jet ink composition including a recording agent, a liquid medium capable of dissolving or dispersing the recording agent, and a compound having an amide group.

U.S. Pat. No. 5,213,613 discloses a jet ink comprising a recording agent and a liquid medium capable of dissolving or dispersing the recording agent therein, wherein the ink contains and imide compound and at least one compound selected from the group consisting of urea, thiourea and derivatives thereof, and volatile alkaline compounds.

U.S. Pat. No. 4,692,188 discloses a process for the preparation of jet ink compositions, comprising (1) dissolving in a water-immiscible organic solvent a polymer composition and an organic oil soluble dye; (2) adding an aqueous phase water surfactant mixture thereto; (3) affecting emulsification thereof; and (4) subsequently evaporating from the aforementioned mixture the solvent thereby resulting in an ink with the dye trapped in the polymer particles suspended in the aqueous phase. The polymer compositions include polycarbonates, polystyrene, polymethacrylates and copolymers thereof.

U.S. patent application Ser. No. 08/121,296, filed Sep. 14, 1994, and assigned to the same entity as the instant application, discloses an ink composition for use in drop-on-demand ink jet operations for printing on porous substrates such as paper and card board, which has low levels of volatile organic compounds and that is both non-teratogenic and non-carcinogenic.

All of the water based jet ink compositions disclosed by the above references are generally directed to ink compositions suitable for printing on paper and are not considered suitable for printing on cold glass, PET, and aluminum surface, especially under humid conditions conducive for the moisture to condense on the surface.

Other attempts to produce ink compositions that will provide penetration, good adhesion and abrasion resistance to messages printed on wet glass, PET and aluminum surfaces have been unsuccessful. Poor adhesion and poor print quality were common, especially when the cold-fill process was in a highly humid environment. Therefore, a need exists for a jet ink composition which can be used to print messages on wet glass, PET, and aluminum surfaces and able to penetrate moisture without smudging, smearing or rubbing off.

A need also exists for an ink composition for use in ink jet applications that can be printed onto cold, wet glass, PET and aluminum container surfaces under humid conditions.

SUMMARY OF THE INVENTION

In accordance with this object, the present invention provides ink compositions capable of being printed onto cold, wet glass, PET, and aluminum surfaces under humid conditions and providing good contrast. The present invention provides ink compositions that are capable of penetrating condensation on a glass, PET, and aluminum surfaces, such as the thin layer of condensation often found during the production of beverages in glass, PET, and aluminum containers under refrigerated conditions.

The ink composition of the present invention comprises an organic solvent, a colorant, polyurethane binder, a silicone resin, and silane. An additional resin and/or a surfactant may also be used in the composition.

The present invention also provides a method of forming printed images on cold wet glass, PET, and aluminum surfaces using the ink composition of the instant invention. In accordance with the invention the method comprises projecting a stream of droplets of said ink composition onto said surface and controlling the direction of said stream electronically so that said droplets form the desired printed image on said surface.

The foregoing and other objects and advantages of the present invention, as well as additional inventive features, will be apparent from the description of the preferred embodiments of the invention provided herein.

DETAILED DESCRIPTION OF THE PREFERRED EMBODIMENTS

The jet ink composition of the instant invention comprises an organic solvent, a dye, and a polyurethane binder, a silicone resin, and a silane and preferably an additional resin and/or a surfactant.

GENERAL PROPERTIES

In general, the ink compositions of the present invention exhibit the following characteristics for use in ink jet printing systems: (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

foregoing. Methyl ethyl ketone is a preferred solvent, optionally in admixture with another solvent, preferably ethanol.

POLYURETHANES

Flexible thermoplastic polyurethane resins are used as binders in the preparation of the ink compositions of the instant invention. Flexible thermoplastic urethanes are produced by the reaction of diols and diisocyanates. Examples of diols include ethylene glycol, propylene glycol, propanediol, butanediol, polyethylene glycol, polypropylene glycol, polyethylene glycol adipate diol, polyethylene glycol succinate diol, polytetrahydrofuran diol, and the like. Examples of diisocyanates include 2,4-tolylene diisocyanate, 2,6-tolylene diisocyanate, 4,4'-diphenylmethane diisocyanate, hexamethylene diisocyanate, and the like. Polyurethanes made from polypropylene glycol and 4,4'-diphenylmethane diisocyanate are preferred.

Polyurethanes having weight average molecular weight in the range of about 4,000 to about 12,000 are preferred and polyurethanes having weight average molecular weight in the range of about 7,000 to about 9,000 are even more preferred.

Examples of preferred urethane polymers that are useful in the present invention include, but are not limited to, the flexible thermoplastic polyurethane solutions sold under the commercial name of SURKOPAK™ by Kane International Corp., Rye, N.Y. A variety of grades of polyurethanes are sold under this name and include SURKOPAK 2135, SURKOPAK 5299, SURKOPAK 5244, SURKOPAK 5255, SURKOPAK 2X, SURKOPAK 5322, SURKOPAK 5311, and SURKOPAK XL. They are normally used to modify nitrocellulose based printing inks for flexo and gravure applications on flexible packaging substrates such as polyethylene, polypropylene, polyester, and cellulose. The physical properties of the polyurethane solutions are presented in Table 1 below.

TABLE 1

Properties of the SURKOPAK™ Polyurethane Resins

| Grade | 2135 | 5299 | 5244* | 5255 | 2X | 5322** | 5311 | XL |
|---|---|---|---|---|---|---|---|---|
| Solids % | 80–85 | 80–85 | 73–78 | 73–78 | 65–70 | 68–73 | 63–68 | 68–73 |
| Viscosity | 15–25 | 25–30 | 12–16 | 25–30 | 40–50 | 6–8 | 30–40 | 15–20 |
| Solvent | A | A | E | E | E | E/A | E | E/A |
| Flash Point, °C. | 12 | 12 | –4 | –4 | –4 | –4 | –4 | –4 |

A = Alcohol; E = Ester; E/A = Mixture of E and A
*Weight Average Molecular Weight Range 18,000–22,000
**Weight Average Molecular Weight Range 7,000–9,000

SOLVENTS

Organic solvents suitable for the ink composition of the instant invention include ketones such as acetone, methyl ethyl ketone, diethyl ketone, cyclohexanone, and the like; esters such ethyl acetate, propyl acetate, butyl acetate, amylacetate, and the like; alcohols such methanol, ethanol, n-propanol, isopropanol, n-butanol, i-butanol, t-butanol, n-pentanol, n-hexanol, and the like; glycols such as ethylene glycol, propylene glycol, glycerin, diethylene glycol, and the like, glycol ethers such as ethylene glycol dimethyl ether, ethylene glycol diethylether, cellosolve, diethylene glycol dimethylether, diethylene glycol diethylether, and the like, and other solvents commonly known to one of ordinary skilled in the art, as well as mixtures of two or more of the These polyurethanes are non-reactive and are essentially free of isocyanate groups. Among these preferred polyurethane solutions, even more preferred is SURKOPAK 5322, which is a polyurethane composed of polypropylene glycol and 4,4'-diphenylmethane diisocyanate. SURKOPAK 5322 is sold as a solution in a mixed solvent containing ethyl acetate and isopropanol.

The concentration of solid polyurethane resin in the ink composition is in the range of about 1 percent to about 20 percent by weight, preferably in the range of about 3 percent to about 15 percent by weight, and more preferably in the range of about 5 percent to about 10 percent by weight. If the polyurethane is commercially sold as a solution, as in the case of SURKOPAK, the amount of the polyurethane solution to be used to prepare the ink is calculated from the concentration of the polyurethane in the solution. Thus, in EXAMPLE 1 below, 11 g of the SURKOPAK 5322 (conc. 68–73%) were used to obtain an ink having about 7.7 g of polyurethane.

COLORANTS

The ink composition comprises a colorant which is a dye that imparts the desired color to the printed message. Any dye that may be dissolved in the ink composition may be used in the instant invention. For instance, U.S. Pat. No. 5,254,158, and UK Patent Application GB 2,105,735 list several examples of dyes. All of these dyes and pigments may be used in the instant invention. Examples of dyes applicable to the present invention include, but are not limited to, the yellow dyes such as C.I. Solvent Yellow 19 (C.I. 13900A), C.I. Solvent Yellow 21 (C.I. 18690), C.I. Solvent Yellow 61, C.I. Solvent Yellow 80, FD&C Yellow #5, Yellow Shade 16948, Acid Yellow 23, Levaderm Lemon Yellow (Mobay), Spirit Fast Yellow 3G, Aizen Spilon Yellow C-GNH (Hodagaya Chemical Co.), Pergasol Yellow CGP (Ciba-Geigy), and the like, the orange dyes such as C.I. Solvent Orange 1 (C.I. 11920), C.I. Orange 37, C.I. Orange 40, Diaresin Orange K (Mitsubishi Chemical Industries, Ltd.), Diaresin Orange G (Mitsubishi Chemical Industries, Ltd.), Sumiplast Orange 3G (Sumitomo Chemical Co., Ltd.), and the like, red dyes such as C.I. Solvent Red 8, C.I. Solvent Red 81, C.I. Solvent Red 82, C.I. Solvent Red 84, C.I. Solvent Red 100, Cibacron Brilliant Red 38-A (Aldrich Chemical Co.), Drimarene Brilliant Red E-6A (Pylam, Inc.), Acid Red 92, Reactive red 31 (ICI America), and the like, pink dyes such as Diaresin Pink M (Mitsubishi Chemical Industries, Ltd.), Sumiplast Pink RFF (Sumitomo Chemical Co.), Direct Brill Pink B Ground Crude (Crompton & Knowles), and the like, violet dyes such as C.I. Solvent Violet 8, C.I. Solvent Violet 21, Diaresin Violet (MitSubishi), Diaresin Violet D, Sumiplast Violet RR (Sumitomo), and the like, blue dyes such as C.I. Solvent Blue 2, C.I. Solvent Blue 11, C.I. Solvent Blue 25, C.I. Solvent Blue 36, C.I. Solvent Blue 55, and the like, green dyes such as C.I. Solvent Green 3 and the like, brown dyes such as C.I. Solvent Brown 3 and Diaresin Brown A (Mitsubishi), and the like, black dyes such as C.I. Solvent Black 3, C.I. Solvent Black 5, C.I. Solvent Black 7, C.I. Solvent Black 22, C.I. Solvent Black 27, C.I. Solvent Black 29, Acid Black 123, and the like.

The colorant is present in the ink composition in an amount required to produce the desired contrast and readability. The colorant is preferably present in the range of about 2 percent to about 12 percent by weight, more preferably in the range of about 4 percent to about 10 percent by weight, and even more preferably in the range of about 5 percent to about 7 percent by weight.

SURFACTANTS

The jet ink composition may preferably contain a surfactant, which may be anionic, cationic, nonionic, or amphoteric. Examples of anionic surfactants are, but are not limited to, alkylbenzene sulfonates such as dodecylbenzene sulfonate, alkylnaphthyl sulfonates such as butyl or nonyl naphthyl sulfonate, dialkyl sulfosuccinates such as diamyl sulfosuccinate, alcohol sulfates such as sodium lauryl sulfate, and perfluorinated carboxylic acids such as perfluorodecanoic acid and perfluorododecanoic acid. Nonionic surfactants include the alkylesters of polyethylene glycol, fatty acid esters of glycerol, fatty acid esters of glycol, and the like, and fluorochemical surfactants such as FC 430, FC 431, FC 740, FC 120, FC 248, FC 352, FC 396, FC 807, and FC 824, which are available from 3M Co. Cationic surfactants include alkylamines, amine oxides, amine ethoxylates, alkyl hydroxyalkyl imidazolines, quaternary ammonium salts, and amphoteric surfactants include the alkylbetaines, the amidopropylbetaines, and the like. The surfactant FC 430, which is a mixture of fluoroaliphatic polymeric acrylate esters, is a preferred surfactant.

The solid surfactant made into solution may be present in the jet ink composition in the range of about 0.007 percent to about 0.05 percent by weight, preferably in the range of about 0.005 percent to about 0.04 percent by weight, and more preferably in the range of about 0.01 percent to about 0.03 percent by weight.

SILICONE ADDITIVES

The jet ink composition may preferably contain a silicone resin. Examples of silicone resins include, but are not limited to, dimethyl silicone resin, methylphenyl silicone resin, and methyltrifluoropropyl silicone resin. Silicone resins are commercially available from Dow Corning Corp. and GE Silicones. A preferred silicone resin is the silicone resin DC6-2230 (Dow Corning), which is a polysiloxane having methyl (48%), phenyl (44%), hydroxyl (4%), O-butyl (2%), and O-propyl(1%) substituents.

The silicone resin may be present in the jet ink composition in the range of about 0.5 percent to about 10 percent by weight, preferably in the range of about 1 percent to about 6 percent by weight, and more preferably in the range of about 2 percent to about 4 percent by weight.

SILANES

The jet ink composition may preferably contain a silane coupling agent. Examples of silanes that may be useful are, but are not limited to, epoxyalkyl alkoxysilanes, aminoalkyl alkoxysilanes such as (4-aminopropyl)triethoxysilane and [γ-(β-aminoethylamino)propyl]trimethoxysilane, vinyltris (β-methoxyethoxy)silane, (γ-methacryloxypropyl) trimethoxysilane, vinylbenzyl cationic silane, (γ-chloropropyl)trimethoxy-silane, and the like. Additional examples of silanes can be found, e.g., in Kirk-Othmer—Encyclopedia of Chemical Technology, 3rd edition (John Wiley & Sons). One preferred silane is the A187 silane from Union Carbide Corp., which is glycidoxypropyl trimethoxysilane.

The silane may be present in the jet ink composition in the range of about 0.1 percent to about 5 percent by weight, preferably in the range of about 0.3 percent to about 4 percent by weight, and more preferably in the range of about 0.5 percent to about 2.5 percent by weight.

OTHER RESINS

The jet ink composition may also preferably contain an additional resin. Other resins may be added to the ink to add hardness and improve abrasion and smear resistance. Other resins may include rosin resins. Examples of rosin resins are Pentalyn H synthetic resin, a pentaerythritol ester of a rosin that has been stabilized by hydrogenation. Also, Foral 85 resin, a thermoplastic glycerol ester of a hydrogenated resin. Both are sold by Hercules, Inc. These resins may also include various acrylic resins such as polyalkylacrylates, the polyalkylmethacrylates, and copolymers thereof. Additional examples of acrylic resins are polymethacrylate, polyethylacrylate, polyethylmethacrylate, polybutylmethacrylate, polymethylmethacrylate, polyhydroxyethylmethacrylate, copolymers of the acrylates, and the like. Several acrylic resins are commercially available from Rohm & Haas Co. A copolymer containing ethylmethacrylate is sold under the name of Acryloid B-72. A polymer of isobutylmethacrylate is sold under the name of Acryloid B-67. A copolymer of methylmethacrylate and ethylacrylate is sold under the name of Acryloid B-44. One preferred acrylic resin is Acryloid B-66, which is a copolymer of methylmethacrylate and butylmethacrylate.

The additional resin may be present in the jet ink composition in the range of about 1 percent to about 12 percent by weight, preferably in the range of about 2 percent to about 10 percent by weight, and more preferably in the range of about 3 percent to about 8 percent by weight.

OTHER ADDITIVES

The jet ink composition may contain in addition additives for adjusting the viscosity, electrical resistivity, and the speed of evaporation. The preferred range of viscosity is about 1.5 centipoise to about 6.0 centipoise. The preferred resistivity is about 500 ohm-cm to about 1500 ohm-cm.

The compositions of the present invention may contain conductivity agents. If present, they usually are present in amounts of from about 0.0 percent to about 2.0 percent. Examples of suitable conductivity agents include dimethylamine hydrochloride, diethylamine hydrochloride, lithium nitrate, and hydroxylamine hydrochloride. Sufficient conductivity is offered by the dye, solvent black 29, in the presence of the ethanol used in the ink. Humectants may be used in the formulations. Humectants include glycerin, ethylene glycol, and the like. Various, known viscosity modifying agents may be added, as needed, to adjust the viscosity of any given ink formulation.

The jet ink formulation may be prepared by any known methods. In one method, all the desired ingredients are combined in a mixer or a mixing vessel and mixed sequentially until a homogeneous solution is obtained.

The jet ink composition may be generally jet printed on to the surface of a wet glass, PET, and aluminum article such as a glass bottle, PET bottle, or aluminum can. Specifically, the jet ink is used to print messages on glass, PET, and aluminum bottles and cans that are used to fill cold beverages including soft drinks such as Pepsi Cola®, Coca Cola®, RC Cola®, 7-UP®, Sprite®, and the like, beer, wine, wine coolers, liquors, and the like, pharmaceuticals, and cosmetics. The jet ink of the instant invention may be jet applied on to a variety of glasses, including soda-lime glasses, borosilicate glasses, alumino-silicate glasses, lead glasses, borate glasses, and the like. The above specified types of glass may contain a coating.

All percentages expressed herein are percentages by weight, based on the total weight of the ink composition of the present invention, unless otherwise indicated.

The following example further illustrates the present invention but, of course, should not be construed as in any way limiting its scope.

EXAMPLE 1

A jet ink composition was prepared by employing the following formulation:

| Ingredient | Percent by weight |
|---|---|
| Methyl ethyl ketone | 71.3 |
| Silicone DC6-2230 (Dow Corning) | 3.0 |
| Acryloid B-66 (Rohm & Haas) | 5.0 |
| SURKOPAK Polyurethane 5322 | 11.0 |
| Solvent Black 29 Dye (Ciba-Geigy) | 6.0 |
| Ethanol CDA-19 200 Proof (EMCO Chemical) | 2.0 |
| Silane A187 (Union Carbide) | 1.5 |
| FC 430 10% in MEK (3M Co.) | 0.2 |
| | 100.0 |

The above ink formulation was prepared and tested on a wide range of glass, PET, and aluminum bottles simulating cold-fill humid conditions. Printer runnability testing was also carried out. The jet ink performed satisfactorily.

Images can be printed on a glass, PET, and aluminum surface under humid conditions using the jet ink composition of the instant invention by projecting a stream of droplets of the ink to the surface and controlling the direction of the stream electronically so that the droplets form the desired printed image on the surface.

All of the references, including patents, patent applications, and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A jet ink composition for printing on glass, PET, and aluminum surfaces under humid conditions messages having good adhesion and abrasion resistance, said composition comprising an organic solvent, a flexible thermoplastic polyurethane resin, a dye, a silicone resin, and a silane, wherein said jet ink composition is a homogeneous solution.

2. The jet ink composition of claim 1, wherein said composition has (1) a viscosity from about 1.6 to about 7.0 centipoises at 25° C.; (2) an electrical resistivity from about 50 to about 2000 ohm-cm; and (3) a sonic velocity from about 1200 to about 1300 meters/second.

3. The jet ink composition of claim 2, wherein said solvent comprises methyl ethyl ketone.

4. The jet ink composition of claim 2, wherein said polyurethane resin comprises polypropylene glycol and 4,4'-diphenylmethane diisocyanate.

5. The jet ink composition of claim 2, wherein said polyurethane resin has a weight average molecular weight of 7,000–9,000.

6. The jet ink composition of claim 2, wherein said polyurethane resin is present in the concentration range of about 3 percent to about 15 percent by weight.

7. The jet ink composition of claim 2, wherein said polyurethane resin is present in the concentration range of about 5 percent to about 10 percent by weight.

8. The jet ink composition of claim 2, wherein said colorant is Solvent Black 29.

9. The jet ink composition of claim 8, wherein said colorant is present in the range of about 4 to about 10 percent by weight.

10. The jet ink composition of claim 2, wherein said composition further comprises an additional resin, to improve hardness, abrasion resistance, and smear resistance.

11. The jet ink composition of claim 10, wherein said additional resin is an acrylic resin.

12. The jet ink composition of claim 11, wherein said acrylic resin is a copolymer of methylmethacrylate and butylmethacrylate and is present in the range of about 2 to about 10 percent by weight.

13. The jet ink composition of claim 12, wherein said acrylic resin is present in the range of about 4 to about 7 percent by weight.

14. The jet ink composition of claim 10, wherein said resin is a rosin resin.

15. The jet ink composition of claim 14, wherein said rosin resin is a pentaerythritol or a glycerol ester of a hydrogenated rosin.

16. The jet ink composition of claim 12, wherein said silicone resin is present in the range of about 1 to about 5 percent by weight.

17. The jet ink composition of claim 16, wherein said silicone resin is present in the range of about 2 to about 4 percent by weight.

18. The jet ink composition of claim 2, wherein said silane is glycidoxypropyl trimethoxysilane and is present in the range of about 0.5 to about 2.5 percent by weight.

19. The jet ink composition of claim 2, wherein said composition further comprises a surfactant.

20. The jet ink composition of claim 19, wherein said surfactant is a fluoroaliphatic polymeric ester and is present in the range of about 0.01 to about 0.2 percent by weight.

21. The jet ink composition of claim 2, wherein said composition further comprises ethanol.

22. The jet ink composition of claim 21, wherein said ethanol is present in the range of about 1 percent to about 5 percent by weight.

23. The jet ink composition of claim 1, wherein said flexible thermoplastic polyurethane resin is present in the range of from about 5 percent to about 10 percent by weight of said composition, said dye is present in the range of from about 4 percent to about 10 percent by weight of said composition, said silicone resin is present in the range of from about 2 percent to about 4 percent by weight of said composition, and said silane is present in the range of from about 0.5 percent to about 2.5 percent by weight of said composition.

* * * * *